(12) United States Patent
De Barros et al.

(10) Patent No.: US 7,724,995 B2
(45) Date of Patent: May 25, 2010

(54) SUPPRESSON OF UNDESIRABLE SIGNAL PROPAGATION MODE(S) DOWNSTREAM OF MODE CONVERTER

(75) Inventors: Carlos De Barros, Boulogne-Billancourt (FR); Lionel Provost, Marcoussis (FR); Xavier Bonnet, St. Remy les Chevreuse (FR); Isabelle Riant, Orsay (FR)

(73) Assignee: Draka Comteq B.V., Amsterdam (NL)

( * ) Notice: Subject to any disclaimer, the term of this patent is extended or adjusted under 35 U.S.C. 154(b) by 417 days.

(21) Appl. No.: 10/566,376

(22) PCT Filed: Sep. 29, 2004

(86) PCT No.: PCT/EP2004/010980

§ 371 (c)(1),
(2), (4) Date: Apr. 16, 2008

(87) PCT Pub. No.: WO2005/036223

PCT Pub. Date: Apr. 21, 2005

(65) Prior Publication Data

US 2009/0041410 A1    Feb. 12, 2009

(30) Foreign Application Priority Data

Oct. 3, 2003    (FR) .................................. 03 11589

(51) Int. Cl.
*G02B 6/26* (2006.01)
*G02B 6/42* (2006.01)
(52) U.S. Cl. .......................................... 385/28; 385/29

(58) Field of Classification Search .................. 385/28, 385/29
See application file for complete search history.

(56) References Cited

U.S. PATENT DOCUMENTS

| 5,185,827 | A | 2/1993 | Poole | |
|---|---|---|---|---|
| 6,269,205 | B1 | 7/2001 | Peral et al. | |
| 6,385,368 | B1 * | 5/2002 | Amundson et al. | 385/28 |
| 6,865,316 | B1 * | 3/2005 | Pratt | 385/29 |

FOREIGN PATENT DOCUMENTS

| EP | 1271194 A2 | 1/2003 |
|---|---|---|
| WO | WO 00/51268 | 8/2000 |
| WO | WO 03/079063 A1 | 9/2003 |

* cited by examiner

*Primary Examiner*—Frank G Font
*Assistant Examiner*—Jerry Blevins
(74) *Attorney, Agent, or Firm*—Sughrue Mion, PLLC

(57) ABSTRACT

An optical device (D) is dedicated to the transformation of the propagation mode of optical signals. This device comprises at least a first mode converter (3) that is supplied with signals that are propagated in a first guided mode and that delivers the signals in a multimode fibre (4) partly in the first guided mode and partly in a second guided more of a higher order that the first. The multimode fibre (4) comprises at least first passive filtering means (R) which have the task of converting the first guided mode into at least one dissipative cladding mode in order to prevent or limit the propagation of the signals in this first guided mode while at the same time authorising the propagation of the signals having the second guided mode in the multimode fibre (4).

10 Claims, 2 Drawing Sheets

Figure 1:
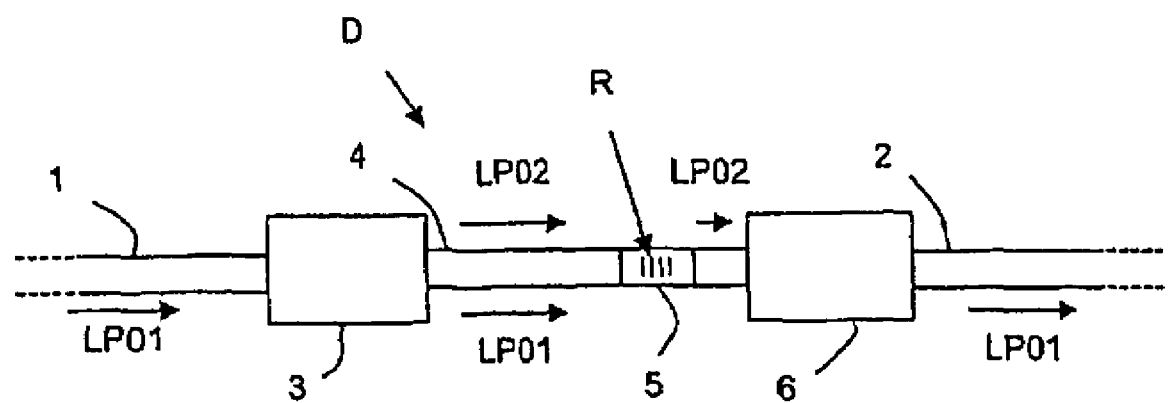

SUPPRESSON OF UNDESIRABLE SIGNAL PROPAGATION MODE(S) DOWNSTREAM OF MODE CONVERTER

The invention relates to the field of optical transmission, and more particularly to propagation mode conversion in optical transmission systems.

Some waveguide structures, such as, for example, optical fibres, permit the transmission of optical signals placed in a so-called "fundamental" propagation mode or in a so-called "high order" or higher order propagation mode which can, in particular, permit an improvement in the overall performance of optical transmission. It is possible specifically to arrange a waveguide structure in such a manner as to confer on it properties, such as, for example, a high degree of negative dispersion and a high efficient surface, which, in particular, enable it to be integrated in a chromatic dispersion compensating module (DCM, which thus comprises a DCF fibre (chromatic dispersion compensating fibre")). This is especially the case of multimode or slightly multimode optical fibres, which are also called high order mode (HOM) fibres whose manufacture has nowadays been mastered very well.

In order to supply this type of structure with signals placed in a high mode, longitudinal mode converters are generally used. Owing to the conversion techniques used, those converters are not capable of 100% conversion of the power of a lower order mode into a selected high (or higher) order mode. Among these various techniques, special mention may be made of long period gratings (LPGs, which are described in particular in the article by S. Ramachandran et al, Electronics Letters, Vol 37, No. 22, October 2001), and tapered fibres comprising an internal central hollow (or tapered hollow fibres, described especially in the article by the Kist Institute, "Tapered Hollow Fibre for Mode Conversion", CLEO'01 paper CtuAA2).

Owing to this power conversion problem, lower order modes coexist with high order modes within HOM optical fibres in more or less large power proportions, depending on the mode conversion quality and the perturbations applied along the fibre. These various modes may therefore interfere in accordance with a mechanism called "multi-path interference" (MPI), thus bringing about a considerable reduction in the quality of detection of these transmitted signals which drastically limits the potential applications of the optical fibres.

In order to prevent such a reduction from impairing transmission, the ratio between the energy transmitted via the undesirable lower order modes and the energy transmitted via the high (or higher) order mode, for a given wavelength, must be less than approximately −40 dB.

In order to reduce the above-mentioned ratio, it is possible, for example, to alter locally the core of the fibre by laser irradiation, the effect of which is to introduce an attenuation of the LP01 mode. However, that also induces an attenuation of the energy of the high order mode (LP02) which is undesirable. As proposed in the patent document U.S. Pat. No. 6,327,403, it is also possible to place an absorption ring in a portion of the HOM fibre in order to attenuate the high order mode (LP02) to a lesser extent than the other modes which are propagated there. More precisely, the absorption ring is placed at the site where the spatial energy distribution of the LP02 mode is zero or minimal.

This solution is efficient but, in order for it not to introduce any additional loss into the high order mode (LP02), the radius of the absorption ring must be as small as possible. For example, for a ring radius of 0.5 μm, an additional loss of 0.11 dB/km is introduced into the high order mode (LP02). In addition, this type of fibre is particularly difficult to produce, given that the exact position of the absorption ring depends on its true index profile. Consequently, optimisation of the positioning of the absorption ring has to be carried out for each type of HOM fibre.

The object of the invention is therefore to improve the situation.

To that end, the invention proposes an optical device for transforming the propagation mode of optical signals, comprising at least a first mode converter associated with a multimode or slightly multimode fibre (or HOM fibre), this first converter being supplied with signals that are propagated in a first guided mode (for example, the fundamental mode (LP01)) and delivering the signals in the multimode fibre partly in the first guided mode and partly in a second guided mode of a higher order than the first (for example, the LP02 mode).

This transformation device is characterized in that its multimode fibre comprises at least first passive filtering means which have the task of converting the first guided mode into at least one dissipative cladding mode. Since the cladding mode is not propagated and the filtering (or conversion) does not alter the properties of the second guided mode, there is a reduction in the ratio between the energies of the lower order mode and the higher order mode.

The mode conversion is here carried out by power coupling between the first guided mode and one or more cladding modes.

In a particularly advantageous embodiment, the first filtering means are produced in the multimode fibre in the form of a first long period grating (LPG). The period of the LPG grating is therefore selected as a function of the cladding mode(s) selected for filtering.

According to another feature of the invention, the multimode fibre may comprise other passive filtering means which have the task of converting one or more other guided modes, of a higher order than the first, into at least one or more other dissipative cladding modes in order to prevent the transmission of the signals propagated in those other guided modes, while at the same time authorising transmission of the signals propagated in the second guided mode of the multimode fibre.

In that case, the other conversion means may also be produced in the multimode fibre in the form of one or more other long period gratings. A cascade of LPG gratings can thus be produced within the multimode fibre in order to suppress several undesirable modes.

The device according to the invention may include other features which can be taken separately or in combination, and in particular:

- its multimode fibre may comprise a cladding having an outside radius whose value at the (first and/or other) filtering means is lower than the value on each side of those means,
- at least one (first and/or other) long period grating may exhibit a variation in the period in order to ensure broadband filtering,
- at least one (first and/or other) long period grating may exhibit an index modulation profile over a selected length in order to provide spectral filtering of substantially rectangular shape,
- it may comprise, downstream of the (first and/or other) filtering means, a second mode converter which has the task of (re)converting the signals that are propagated in the second mode into signals that are propagated in the first mode.

Figure 2:
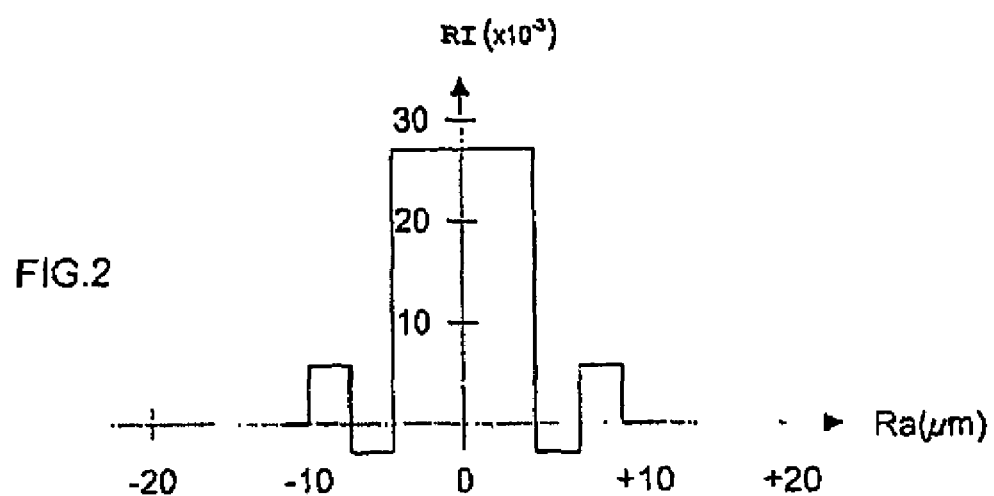
Figure 3:
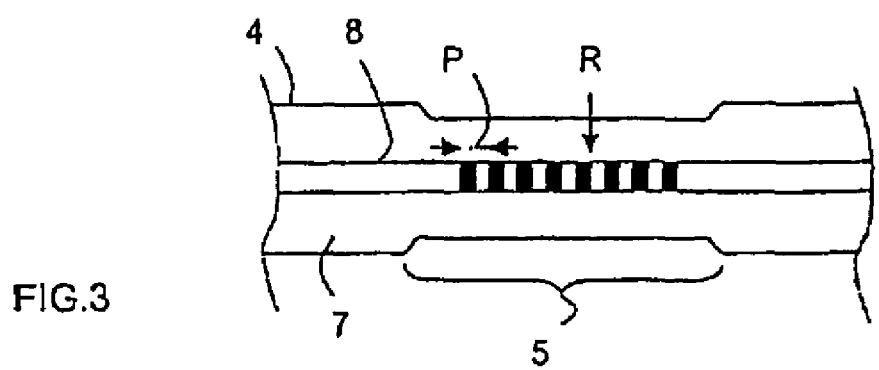
Figure 4:
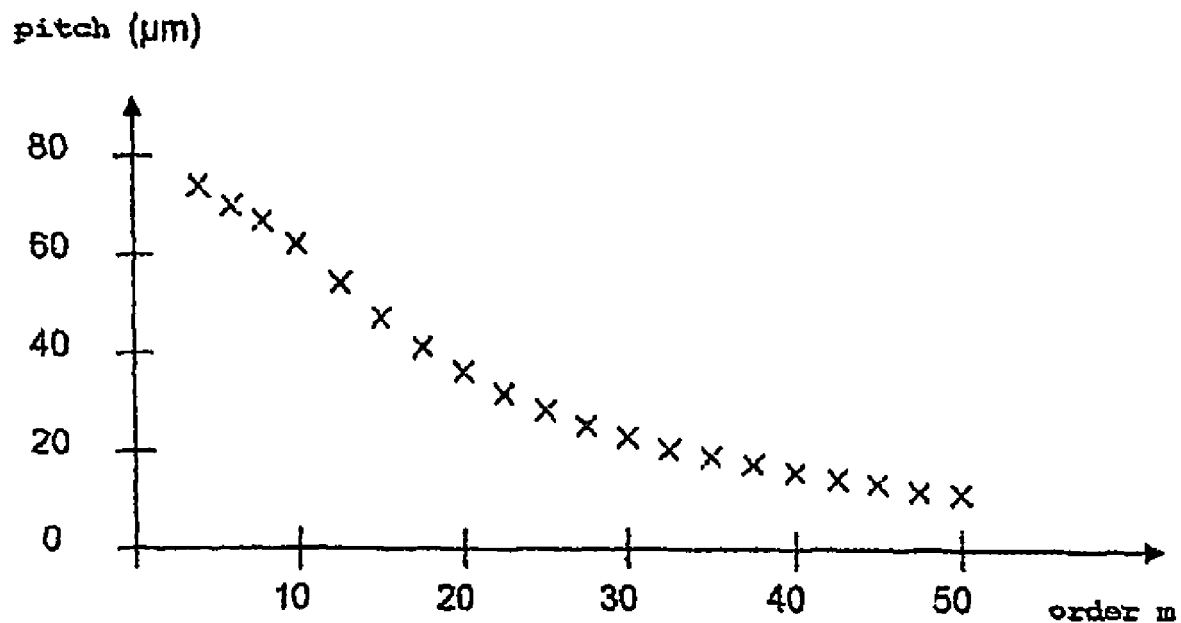
Figure 5:
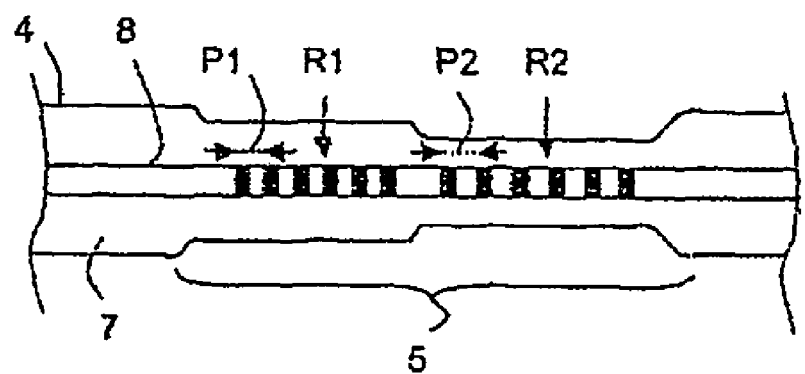

Other features and advantages of the invention will emerge on examining the following detailed description and the appended drawings, in which:

FIG. 1 illustrates schematically an embodiment of a mode transformation device according to the invention, FIG. 2 is a graph illustrating schematically the refractive index (RI) of an example of an optical fibre of the HOM type, as a function of its radius (Ra), FIG. 3 illustrates schematically a first embodiment of a mode filtering means of a mode transformation device according to the invention, FIG. 4 is a graph illustrating schematically the development of the periodic pitch (in μm) of a long period grating (LPG) as a function of the so-called orbital order m of the cladding mode, in the case of coupling of the LP01-LP0m type at a wavelength of 1550 nm, and FIG. 5 illustrates schematically a second embodiment of a mode filtering means of a mode transformation device according to the invention.

The appended drawings can be used not only to complement the invention but also to contribute to the definition thereof, where appropriate.

The invention relates to the suppression of (an) undesirable guided mode(s) downstream of a mode converter.

To that end it proposes an optical device for transforming the propagation mode of optical signals, which device may be, for example, implanted in (or may constitute) a chromatic dispersion compensating module implanted in an optical fibre transmission line.

The transmission line illustrated in FIG. 1 comprises an upstream optical fibre 1 connected to a downstream optical fibre 2 by way of a transmission device according to the invention D.

The upstream optical fibre 1, like the downstream optical fibre 2, is, for example, a single-mode optical fibre (SMF) in which signals placed in a first guided mode, such as, for example, the fundamental LP01 mode, are propagated.

The illustrated transformation device D comprises a first mode converter 3 coupled to a multimode or slightly multimode fibre (or also an HOM fibre) 4 provided with a passive mode(s) filter 5 and coupled to a second mode converter 6 coupled to the downstream optical fibre 2.

An example of a refractive index profile RI for an HOM fibre 4, normally used in a DCF module, is given purely by way of example in FIG. 2.

The first mode converter 3 is a converter which does not permit 100% conversion of the first mode into the second mode. However, the invention relates to any type of mode converter. The mode converter has the task of converting the signals that are placed in the lower order guided mode (here LP01) and that are delivered by the upstream optical fibre 1, into signals that are propagated in accordance with a second guided mode LP0m (for example m=2) of a higher order than the LP01 mode.

The second mode converter 6 has the task of converting the signals that are placed in the second guided mode, for example LP02, and that are delivered by the HOM fibre 4, into signals that are propagated in accordance with the LP01 mode, in order to supply the downstream optical fibre 2. This converter is also one that does not permit 100% conversion of the second mode into the first mode.

In the presence of two mode converters 3 and 6, the mode (s) filter 5 is preferably placed in the vicinity of the second converter 6, and of course upstream thereof. This prevents, for example, parasitic mode recouplings from occurring within the HOM fibre 4 to too great an extent between the output of the mode filter 5 and the input of the mode converter 6 and/or makes it possible to proceed with a first preliminary filtering of the guided modes before the next reconversion at the mode converter 6 in order to minimize a possible consequence on the conversion by this converter 6 of the excessively great importance of the LP01 mode, for example, downstream of the converter 6. For example, the mode(s) filter 5 may be placed at a distance from the second converter 6 of from approximately a few tens of centimeters to approximately a few centimeters.

It is important to note that the device according to the invention D may comprise only a single mode converter 3 followed by a passive mode(s) filter 5.

The HOM fibre 4 is suitable for the propagation of the high order mode (here LP02). However, since the conversion of the LP01 mode of the fibre 1 to the LP02 mode of the HOM fibre 4, which is carried out by the first converter 3, is not 100% efficient, some of the signals remain in the LP01 mode and continue their journey in the HOM fibre 4. Owing to the coexistence of the LP01 and LP02 modes in the HOM fibre 4, a so-called "multi-path" interference phenomenon (MPI) occurs, as indicated in the introductory part. Since this phenomenon impairs transmission quality, the mode(s) filter 5 has the task of preventing it from occurring as far as possible.

According to the invention, the passive mode(s) filter 5 has the task of converting at least the first guided mode (here LP01) into at least one dissipative cladding mode. This mode conversion is effected by coupling between the guided LP01 mode and one or more cladding modes.

Owing to this filtering by mode conversion, the LP01 mode signals can no longer be propagated in the core of the HOM fibre 4, unlike the signals converted into the high order mode (here LP02), because their power is dissipated in the cladding 7 of the HOM fibre 4.

The mode(s) filter 5 is preferably produced in the HOM fibre 4 in the form of one or more long period gratings (LPGs).

The long period grating (LPG) can be produced by periodic modification of the refractive index of the core of the HOM fibre 4, brought about by UV irradiation.

In the embodiment illustrated in FIG. 3, the filter 5 comprises only a single LPG grating R which is to suppress a single mode (here LP01) by dissipating it by coupling in the cladding 7 of the HOM fibre 4. However, as will be seen hereinafter with reference to FIG. 5, the filter 5 may comprise a cascade of at least two LPG gratings which have different periods and which are each intended to suppress an undesirable mode.

An LPG grating R makes it possible to couple, in a co-propagating direction, the light (optical signals) which is propagated in the HOM fibre 4 in accordance with a guided mode (here LP01) to a cladding mode in conformity with the following phase tuning condition:

$$\lambda_m = (n_{\textit{eff}}^{\textit{guided mode}} - n_{\textit{eff}}^{\textit{cladding mode }(m)}) * \Lambda$$

where $\lambda_m$ is the wavelength at which coupling is effected between the guided mode in the core 8 of the HOM fibre 4 and the cladding mode m within the cladding 7 of the said HOM fibre, $n_{\textit{eff}}^{\textit{guided mode}}$ is the effective index of the guided mode, $n_{\textit{eff}}^{\textit{cladding mode }(m)}$ is the effective index of the cladding mode m, and $\Lambda$ is the period (or pitch) P of the LPG grating R.

It follows from this condition that, for a given period P of the LPG grating R, each coupling of a guided mode to a cladding mode m occurs at a specific wavelength. The efficiency of each coupling therefore depends directly on the amplitude overlap integral of the modes under consideration with the zone which is photo-inscribed in a cross-section of the fibre.

For example, if the LP02 mode is attached at a wavelength λ equal to 1550 nm, it is necessary to verify the three conditions given below if it is desired, on the one hand, that the LP01 mode should be coupled to a cladding mode m at the wavelength λ and, on the other hand, that the LP02 mode should be coupled neither to a cladding mode m', nor to the following cladding mode m'+1 in a sufficiently broad spectral band located at around 1550 nm (for example, from 1500 to 1600 nm (containing the normalized bands called C and L)):

$$\lambda_{LP01 \to LP0m} = (n_{eff}^{LP01} - n_{eff}^{LP0m}) * \Lambda = 1550 \text{ nm}$$

$$\lambda_{LP02 \to LP0m'} = (n_{eff}^{LP02} - n_{eff}^{LP0m'}) * \Lambda > 1660 \text{ nm}$$

$$\lambda_{LP02 \to LP0m'+1} = (n_{eff}^{LP02} - n_{eff}^{LP0m'+1}) * \Lambda < 1500 \text{ nm}$$

When an HOM fibre that has not been modified (except for the presence of the mode filter 5) is used, the wavelengths for coupling the LP02 mode to cladding modes LP0m' and LP0m'+1 may be very close to the operating wavelength, which may make it difficult, or even impossible, to produce the spectral filtering shape.

This can be verified by means of the graph in FIG. 4 which describes the development of the period P (in μm) of an LPG grating R as a function of the order m of the cladding mode, in the case of coupling of the type LP01-LP0m at a wavelength of 1550 nm. It will be observed that, for the order m=20, the pitch P of the LPG grating must be equal to 37 μm. This pitch P corresponds to wavelengths for coupling the LP02 mode to the LP027 and LP028 modes equal to 1480 nm and 1595 nm, respectively, (vicinity of the C band).

Broadband filtering is therefore necessary. This can be obtained by means of a variation (or chirp) of the period P of the LPG grating R. By way of supplement or variation, it is possible to produce a profile of the index modulation over a selected length (or apodization) of the LPG grating R in order to obtain spectral filtering of a substantially rectangular shape.

However, for better spectral separation of the couplings between guided mode and cladding modes, it is possible to proceed in a different manner, as will now be seen.

As the person skilled in the art knows, in an optical fibre the guided mode and its propagation constant (another equivalent variable called the effective index is also used) are determined in an excellent manner by the "opto-geometrical" structure of the core 8 and the boundary conditions of the electric field associated with the interface between the core 8 and the cladding 7. On the other hand, the effective indices of the cladding modes are to a first approximation defined by the structure of the cladding 7, the value of the index of the cladding 7 and the boundary conditions at the interface between the cladding 7 and the outside environment.

Consequently, owing to the interface conditions, a discrete number of eigenvalues of effective indices correspond to a finite width of the cladding 7. Thus, for a cylindrical fibre having a circular cross-section, the cladding modes correspond to the modes of a Fabry-Perot cavity of the circular type defined by the cladding. To a first approximation, the effective indices $n_{eff}^{n,m}$ of the various cladding modes LPn,m (with n and m being integers, and m being other than zero) are given by the roots of the following equation:

$$J_n\left(W_{n,m} * \frac{r}{rcl}\right)_{r=rcl} = J_n(W_{n,m}) = J_n\left(\frac{2\pi}{\lambda} rcl \sqrt{\left(ncl^2 - n_{eff}^{n,m2}\right)}\right) = 0$$

where $J_n$ is the Bessel function of order n, ncl is the index of the cladding 7, rcl is the outside radius of the cladding 7 and λ is the wavelength.

It results from this equation that, for a given family of modes (n fixed), the discrete values of the effective indices depend directly on the value of the outside radius of the cladding 7.

Consequently, by reducing the outside radius of the cladding, for example by ablation, the effective index associated with each cladding mode decreases in a manner which is inversely proportional to the outside radius and in a manner which is proportional to the order m of the cladding mode concerned. The difference in the effective indices associated with consecutive cladding modes therefore increases in a manner which is inversely proportional to the outside radius and in a manner which is proportional to the order m of the cladding modes.

This variation in the radius of the cladding 7 is illustrated schematically in FIG. 3.

As mentioned above, and as illustrated in FIG. 5, the filter 5 may comprise a cascade of at least two LPG gratings in order to convert the lower order mode (here LP01) and at least one other mode of a higher order, such as, for example, LP21.

In the example illustrated, the first LPG grating R1 has a first periodic pitch P1 suitable for coupling the LP01 mode to a first cladding mode with a view to its dissipation in the cladding 7, while the second LPG grating R2 has a second periodic pitch P2 which is different from P1 and which is suitable for coupling the LP21 mode to a second cladding mode with a view to its dissipation in the cladding 7. In this example, each portion of cladding 7 of the filter 5, which portion is associated with an LPG grating R1 or R2, has a reduced outside radius, these outside radii being different. However, this is of course not obligatory.

Several LPG gratings can be placed in a cascade one after the other, as indicated above. However, it is also possible to produce a single LPG grating exhibiting a longitudinal period (or pitch) variation in order to produce a "composite" filtering function.

Among the transformation functions which a device according to the invention D may use, there may be mentioned in particular, in addition to the filtering of (a) mode(s), in-line mode changing. Several devices D may be placed in series in a transmission line in order to permit the alternate propagation of a selected channel by the lower order modes (LP01, for example) and the high order modes (LP02, for example).

The invention is not limited to the embodiments of the transformation device that have been described above purely by way of example, but it encompasses all the variants which the person skilled in the art might consider within the scope of the following claims.

The invention claimed is:

1. Optical device (D) for transforming the propagation mode of optical signals, comprising at least a first mode converter, (3) associated with a multimode fibre (4), the first converter (3) being supplied with signals that are propagated in accordance with a first guided mode and delivering those signals in the multimode fibre (4) partly in the first guided mode and partly in a second guided mode of a higher order than the first, characterized in that the multimode fibre (4) comprises at least first passive filtering means (R, R1) which are arranged to convert the first guided mode into at least one dissipative cladding mode in order to prevent or limit the propagation of the signals in this first guided mode while at the same time authorising the propagation of the signals in the second guided mode in the multimode fibre (4).

2. Device according to claim 1, wherein the first filtering means (R, R1) are produced in the multimode fibre (4) in the form of a first long period grating, the period (P, P1) being selected as a function of the dissipative cladding mode.

3. Device according to claim 2, wherein the multimode fibre (4) comprises a cladding (7) having an outside radius whose value at the first (R, R1) and/or second (R2) filtering means is lower than the value on each side of those first and/or second filtering means.

4. Device according to claim 2, wherein the first (R, R1) and/or second (R2) long period grating(s) exhibit(s) a variation in the period in order to ensure broadband filtering.

5. Device according to claim 2, wherein the first (R1) and/or second (R2) long period grating(s) exhibit(s) an index modulation profile over a selected length in order to provide spectral filtering of substantially rectangular shape.

6. Device according to claim 1, wherein the multimode fibre (4) comprises at least second passive filtering means (R2) arranged to convert a third guided mode, of a higher order than the first, into at least one dissipative cladding mode in order to prevent or limit the propagation of the signals in this third guided mode while at the same time authorising the propagation of the signals in the second guided mode in the multimode fibre (4).

7. Device according to claim 6, wherein the second conversion means (R2) are produced in the multimode fibre (4) in the form of a second long period grating, the period (P2) being selected as a function of the dissipative cladding mode.

8. Device according to claim 1, wherein it comprises, downstream of the first (R, R1) and/or second (R2) filtering means, a second mode converter (6) arranged to convert into the first mode the second mode of the signals that are propagated in the multimode fibre (4) which supplies it.

9. Device according to claim 8, wherein the first (R, R1) and/or second (R2) filtering means are placed in the vicinity of the second mode converter (6).

10. Device according to claim 9, wherein the first (R, R1) and/or second (R2) filtering means are placed upstream of the second mode converter (6) at a distance of a few tens of centimeters to a few centimeters.

* * * * *